United States Patent Office 2,760,413
Patented Aug. 28, 1956

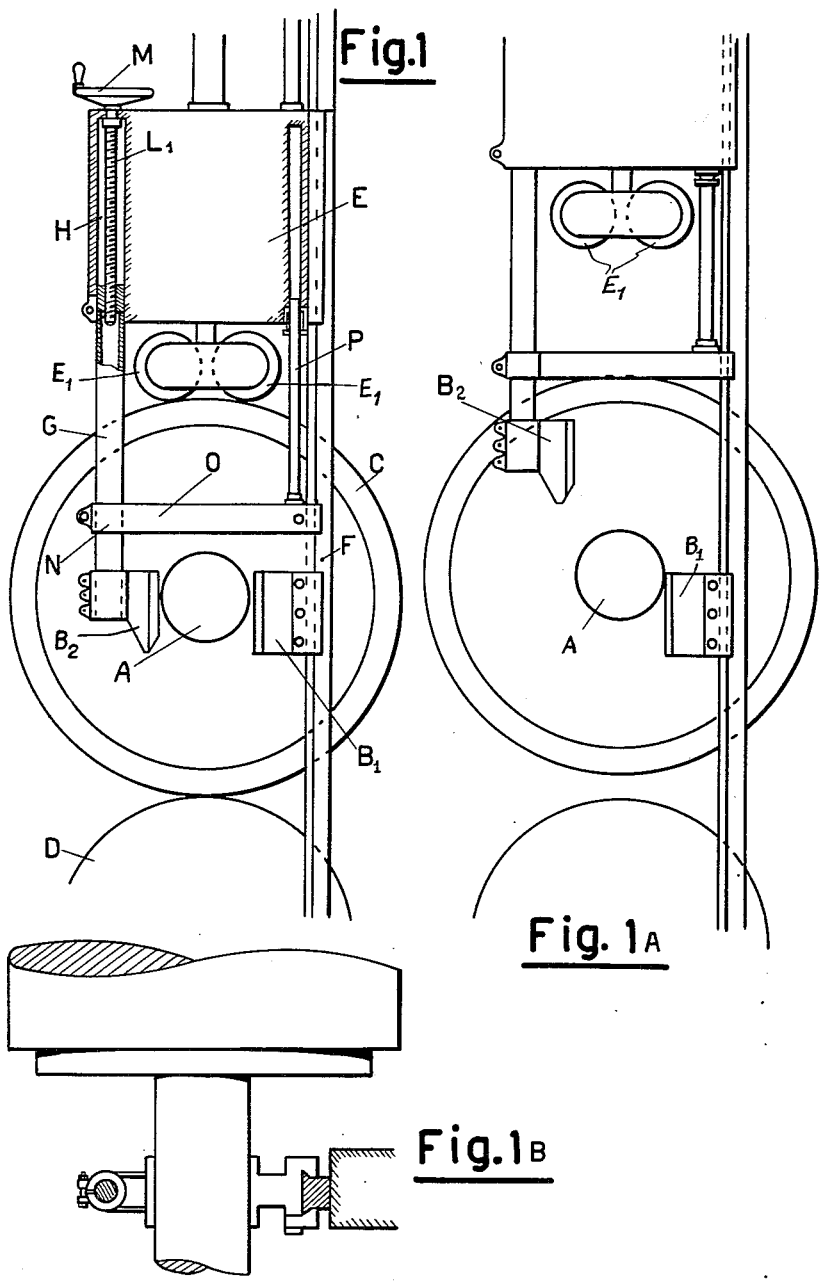

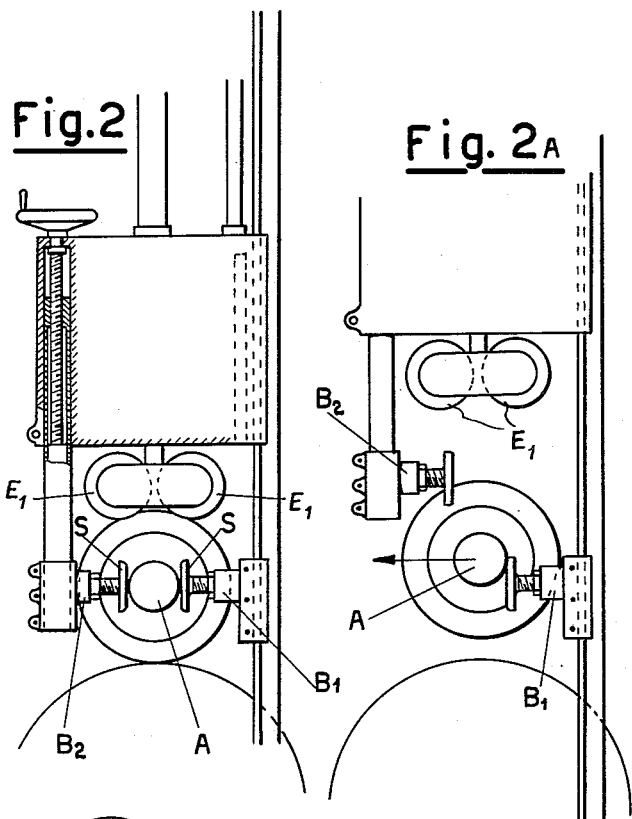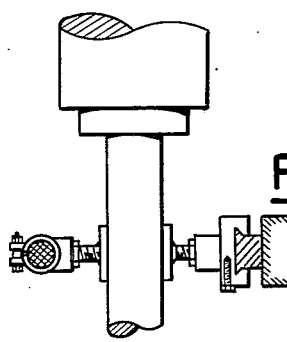

2,760,413
AUTOMATIC CONTROL FOR MANDREL-CARRYING SHAFT IN TUBE FORMING MACHINES

Dante Colliva, Milan, Italy, assignor to Società Alessandro Calzoni, Bologna, Italy Application April 15, 1953, Serial No. 348,991

3 Claims. (Cl. 92—66)

In the machines used at present for forming tubes or pipes from fibrous suspensions, in particular tubes of cement asbestos of the kind described in U. S. patent specification No. 1,627,104, the shaft carrying the mandrel or "main pipe forming cylinder," is held at one end by a support fixed to a rotatable column and at its other end by two jaws, which may be controlled either with hand-operated tilting or with lowering caused by a fluid-dynamical control by way of a piston controlled by a distributor.

Both these systems require, therefore, a specific operation to make the shaft carrying the mandrel or main pipe forming cylinder free from the machine.

The present invention relates to a device for the operation of disengaging the shaft carrying said mandrel, from the machine, which is completely automatic.

In the accompanying drawing there are illustrated two forms of the embodiment:

In Figures 1—1A and 1B for tubes or pipes of large diameter, in elevation and in plan;

In Figures 2—2A and 2B, analogously for tubes or pipes of small diameter.

In said drawings, in Fig. 1 is designated with A the shaft carrying the mandrel or main pipe forming cylinder, with C the tube or pipe being formed, which rests on the supporting cylinder D, with E is designated the movable head having pressure rollers E1 depending therefrom and movable vertically therewith, as can be seen from a comparison of Fig. 1A with Fig. 1. A jaw B1 is fixed by clamping on a vertical guide rigid to the machine F and along which the head E is slidable, and a jaw B2 is supported by a tubular shaft G guided prismatically in the cylindrical guide H, provided in the movable head E and displaceable axially by means of the threaded stem L1, operated by the hand-wheel M, which stem engages in the nut with which the end of the shaft G is provided. A clamp N supported by the arm O supported in turn by the movable head, by way of the stem P, permits stiffening of the jaw B2 in the desired position. The shaft A carrying the mandrel or main pipe forming cylinder is held by the jaws B1 and B2. When the operator commands lifting of the head E, he liberates automatically the shaft carrying the mandrel or main pipe forming cylinder as results from comparison of Figures 1 and 1A, thereby eliminating one control-operation.

The embodiments of Figures 2—2A—2B differ from those described above in that here there is not provided a member corresponding to the clamp N and because the jaws are equipped with pads S radially adjustable in respect to the shaft carrying the mandrel.

Hence, while with all of the embodiments it is possible to register the vertical position of the jaws depending on the tube diameter, the second embodiment provides adjustability of the horizontal distance of the jaws in accordance with greater variability of the diameter of the shafts carrying the mandrels, in the instances in which tubes having small diameters have to be formed.

What I claim is:

1. In a machine for forming tubes and pipes from fibrous suspensions and including a rotatable shaft having a mandrel thereon on which a fibrous suspension is deposited to form a tube or pipe, pressure rollers having their axes parallel to the axis of the shaft for rolling contact, from above, with a mandrel on the latter, a movable head supporting said pressure rollers, and a vertical guide along which said head is slidable to move the pressure rollers toward and away from the surface of the mandrel; the combination comprising pairs of jaws engageable with said shaft from the opposite sides of the latter at the opposite ends of said shaft for gripping the latter between said pairs of jaws, means securing one jaw of each of said pairs of jaws to said guide at the level of said shaft, and vertically adjustable means depending from said head and supporting the other jaw of each pair of jaws for movement with said head, said other jaw of each pair of jaws being positioned relative to said head so that, when the head is positioned to dispose said pressure rollers in rolling contact with the mandrel, said other jaw is positioned opposite said one jaw of the related pairs of jaws and at the level of said shaft to grip the latter between said jaws and prevent removal of said shaft from the machine, while raising of said head to disengage said pressure rollers from the mandrel automatically and simultaneously raises said other jaw of each pair of jaws above said one jaw of the related pair of jaws and above the level of said shaft to permit lateral removal of the latter from the machine.

2. In a machine for forming tubes and pipes from fibrous suspensions and including a rotatable shaft having a mandrel thereon on which a fibrous suspension is deposited to form a tube or pipe, pressure rollers having their axes parallel to the axis of the shaft for rolling contact, from above, with a mandrel on the latter, a movable head supporting said pressure rollers, and a vertical guide along which said head is slidable to move the pressure rollers toward and away from the surface of the mandrel; the combination of claim 1; wherein said means supporting the other of said jaws from said head includes a first vertical member slidably carried by said head at one side of the vertical plane passing through the axis of said shaft, a second vertical member slidably carried by said head at the other side of said plane, a horizontal arm extending rigidly between said first and second vertical members to laterally stabilize the latter, means for effecting vertical movement of said first member relative to said head, and means securing said other head to the lower end of said first vertical member.

3. In a machine for forming tubes and pipes from fibrous suspensions and including a rotatable shaft having a mandrel thereon on which a fibrous suspension is deposited to form a tube or pipe, pressure rollers having their axes parallel to the axis of the shaft for rolling contact, from above, with a mandrel on the latter, a movable head supporting said pressure rollers, and a vertical guide along which said head is slidable to move the pressure rollers toward and away from the surface of the mandrel; the combination according to claim 1, wherein each of said jaws includes a pad engageable with said shaft, and means supporting said pads to permit adjustment thereof laterally toward and away from the axis of the shaft so that shafts of different diameters can be accommodated between said pads.

References Cited in the file of this patent

UNITED STATES PATENTS

| 1,164,426 | Storrer | Dec. 14, 1915 |
| 1,627,104 | Mattei et al. | May 3, 1927 |
| 2,176,198 | Berry | Oct. 17, 1939 |
| 2,308,040 | Anderson | Jan. 12, 1943 |

FOREIGN PATENTS

| 262,265 | Great Britain | Dec. 9, 1926 |
| 265,925 | Great Britain | Dec. 15, 1927 |
| 369,356 | Great Britain | Mar. 24, 1932 |